United States Patent
MacLean et al.

(10) Patent No.: US 6,965,223 B1
(45) Date of Patent: Nov. 15, 2005

(54) METHOD AND APPARATUS TO ALLOW RAPID ADJUSTMENT OF THE REFERENCE VOLTAGE IN A SWITCHING REGULATOR

(75) Inventors: William MacLean, Tucson, AZ (US); Glenn Chance Dunlap, III, Tucson, AZ (US); Thatcher Klumpp, Tucson, AZ (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 10/885,344

(22) Filed: Jul. 6, 2004

(51) Int. Cl.[7] ............................................. G05F 1/44
(52) U.S. Cl. ...................... 323/284; 323/276; 323/281; 323/901
(58) Field of Search ................................. 323/271, 273, 323/274, 276, 281, 282, 284, 288, 351, 901; 363/49

(56) References Cited

U.S. PATENT DOCUMENTS

| | | | |
|---|---|---|---|
| 5,939,870 A | * | 8/1999 | Nguyen et al. ............. 323/282 |
| 6,091,234 A | * | 7/2000 | Kitagawa ..................... 323/244 |
| 6,100,677 A | * | 8/2000 | Farrenkopf .................. 323/285 |
| 6,377,480 B1 | * | 4/2002 | Sase et al. ..................... 363/49 |
| 6,525,517 B1 | * | 2/2003 | Hojo et al. .................. 323/316 |
| 6,617,834 B2 | * | 9/2003 | Tran ............................ 323/288 |
| 6,674,272 B2 | * | 1/2004 | Hwang ........................ 323/284 |
| 2004/0080886 A1 | * | 4/2004 | Ishikawa et al. .............. 361/62 |

* cited by examiner

*Primary Examiner*—Gary L. Laxton
(74) *Attorney, Agent, or Firm*—Darby & Darby P.C.; John W. Branch

(57) ABSTRACT

A circuit and method for enabling a rapid adjustment of a reference voltage during a disable period such as a fault condition, shutdown condition, and the like, of a voltage regulator is described. A soft start circuit that is arranged to couple a reference voltage input of an error amplifier to a portion of an output voltage avoiding high current surges and optimizing start up time is modified to include a low resistance switch that provides a path for a reference node capacitance to rapidly discharge. The faster discharge may allow the reference voltage to match the output voltage even when the switch is activated for a very brief interval. This in return allows the output voltage to start up in a controlled manner after a disable period.

22 Claims, 4 Drawing Sheets

METHOD AND APPARATUS TO ALLOW RAPID ADJUSTMENT OF THE REFERENCE VOLTAGE IN A SWITCHING REGULATOR

FIELD OF THE INVENTION

The present invention relates to switching voltage regulators, and, in particular, to a circuit for enabling a rapid adjustment of a reference voltage during a fault condition.

BACKGROUND

A power conversion circuit (e.g., a switching regulator) may accept a Direct Current (DC) voltage source at one level and output a desired DC voltage at another level. The switching regulator may include one or more switches, which can be implemented by Metal-Oxide-Semiconductor-Field-Effect-Transistors (MOSFETs), and the like. The switches may alternate between connecting and disconnecting the voltage source to subcircuits that drive an output. Typically, a duty cycle of the switching determines the output voltage level. The switching is generally controlled by a Pulse-Width Modulation (PWM) circuit.

Switching regulators are useful in high current applications, such as high power microprocessors, notebook computers, desktop computers, network servers, large memory arrays, workstations and DC high power distribution systems, and the like. The switching regulator can have multiple parallel channels to process one or more voltage sources to drive a common output. A transient response of typical switching regulators may not be satisfactory in applications with demands for high slew rates of output currents. The switching regulator may regulate the output voltage employing a relatively slow feedback circuit which continuously adjusts a control parameter, such as a duty cycle. The duty cycle may be adjusted in accordance with differences between the output voltage of the switching regulator and a nominal value provided by a reference voltage.

Although the switching regulator can theoretically achieve faster transient responses by operating at higher frequencies, practical switching devices limit the operating frequencies of the switching regulator. For instance, the inherent impedance of the switching devices reduces efficiency at high switching frequencies.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

Figure 1:
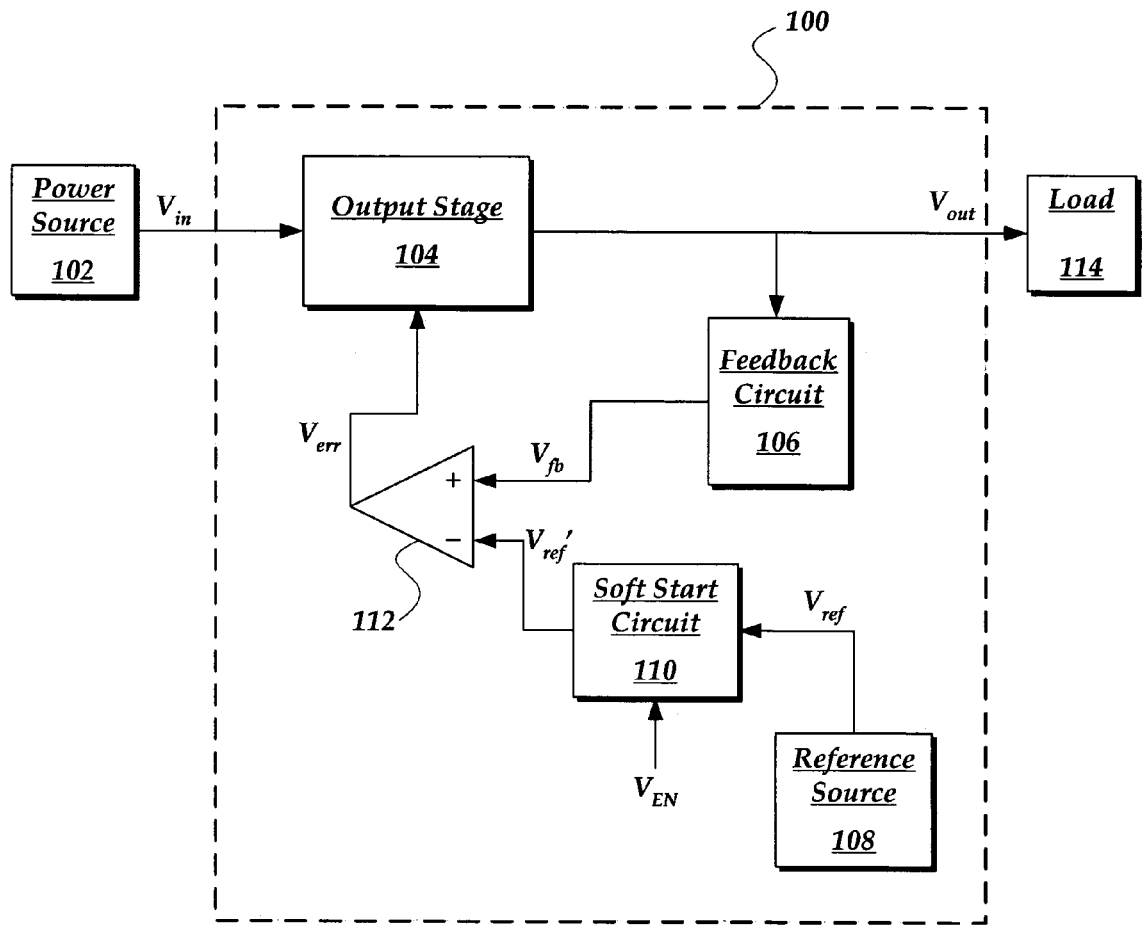
FIG. 1 illustrates a block diagram of an embodiment of a voltage regulator circuit according to the present invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to a circuit for enabling a rapid adjustment of a reference voltage during a disable period such as a fault condition, shutdown condition, and the like of a voltage regulator.

A common method of soft starting a voltage regulator is to ramp up the reference voltage that is used to regulate an output voltage from zero volts each time the switching voltage regulator is enabled. Rapid disable and enable cycles may occur in response to an overload condition, short-circuit of the output, and the like. In one implementation, the switching voltage regulator may have an LC filter at its output stage that may be opened when the circuit is disabled. This mode of operation may allow the output voltage to decay towards zero volts based on a time constant of a load and the LC filter capacitor. An undesirable result of this configuration may be high discharge current values due to the output voltage not being able to decay fully to zero volts during short disable periods.

Another configuration that is arranged to reduce large current and voltage transients following short disable periods may employ tracking the decaying output voltage during disable condition and starting the reference voltage at the tracked output voltage when an enable signal triggers an end of the short disable period. This modified soft start configuration may be implemented by adding a switch to couple a soft start capacitor through a voltage divider to the output voltage. This configuration may, however, result in longer discharge time for the capacitor limiting a choice of values for the voltage divider.

The present invention provides a soft start circuit that is arranged to couple the switch of the modified soft start configuration through a second switch to a low resistance voltage divider that provides a path for the reference node capacitance to rapidly discharge. The faster discharge may allow the reference voltage to match the output voltage even when the switch is activated for a very brief interval. This in return allows the output voltage to start up in a controlled manner after the disable period.

While a preferred embodiment of the present invention may be implemented in a switching voltage regulator circuit, the invention is not so limited. The described circuit and parts of it may be employed as part of virtually any switching or linear voltage regulator circuit known to those skilled in the art.

FIG. 1 illustrates a block diagram of an embodiment of voltage regulator circuit 100 according to the present invention along with power source 102 and load 114. Power source 102 may include any DC power source such as an AC/DC converter, a DC/DC converter, a battery, and the like.

Voltage regulator circuit 100 includes output stage 104, feedback circuit 106, reference source 108, soft start circuit 110, and error amplifier 112. FIG. 1 shows a particular arrangement of inputs and outputs of the various components. In one embodiment, all of the components of voltage regulator circuit 100 may be included in the same chip. Alternatively, one or more of the components of circuit 100 may be off-chip.

Output stage 104 is configured to receive input voltage Vin from power source 102 and provide regulated output voltage $V_{out}$ to load 114 in response to $V_{in}$ and error voltage $V_{err}$ from error amplifier 112.

Feedback circuit 106 is arranged to receive output voltage $V_{out}$ and provide feedback voltage $V_{fb}$ to an input of error amplifier 112. In one embodiment, feedback circuit 106 may include a voltage divider.

Reference source 108 is arranged to provide a reference voltage $V_{ref}$ for regulation of the output voltage. In a switching voltage regulator that does not include a soft start feature, $V_{ref}$ may be provided to another input of error amplifier 112 resulting in the regulation of output voltage $V_{out}$ based on a difference between $V_{fb}$ and $V_{ref}$. This may lead to undesirably high discharge currents, and the like after short disable periods as described above.

In one embodiment of the present invention, soft start circuit 110 is arranged to receive $V_{ref}$ and to provide modified reference voltage $V_{ref}'$ to the other input of error amplifier 112 such that transient currents and voltages after short disable periods are reduced while a discharge time of the soft start capacitance is not relatively short.

Error amplifier 112 is arranged to receive $V_{ref}'$ and $V_{fb}$ and provide error voltage $V_{err}$ to output stage 104 for regulation of output voltage $V_{out}$. In another embodiment, a pulse-width-modulation (PWM) comparator may be employed between error amplifier 112 and output stage 104.

Figure 2:
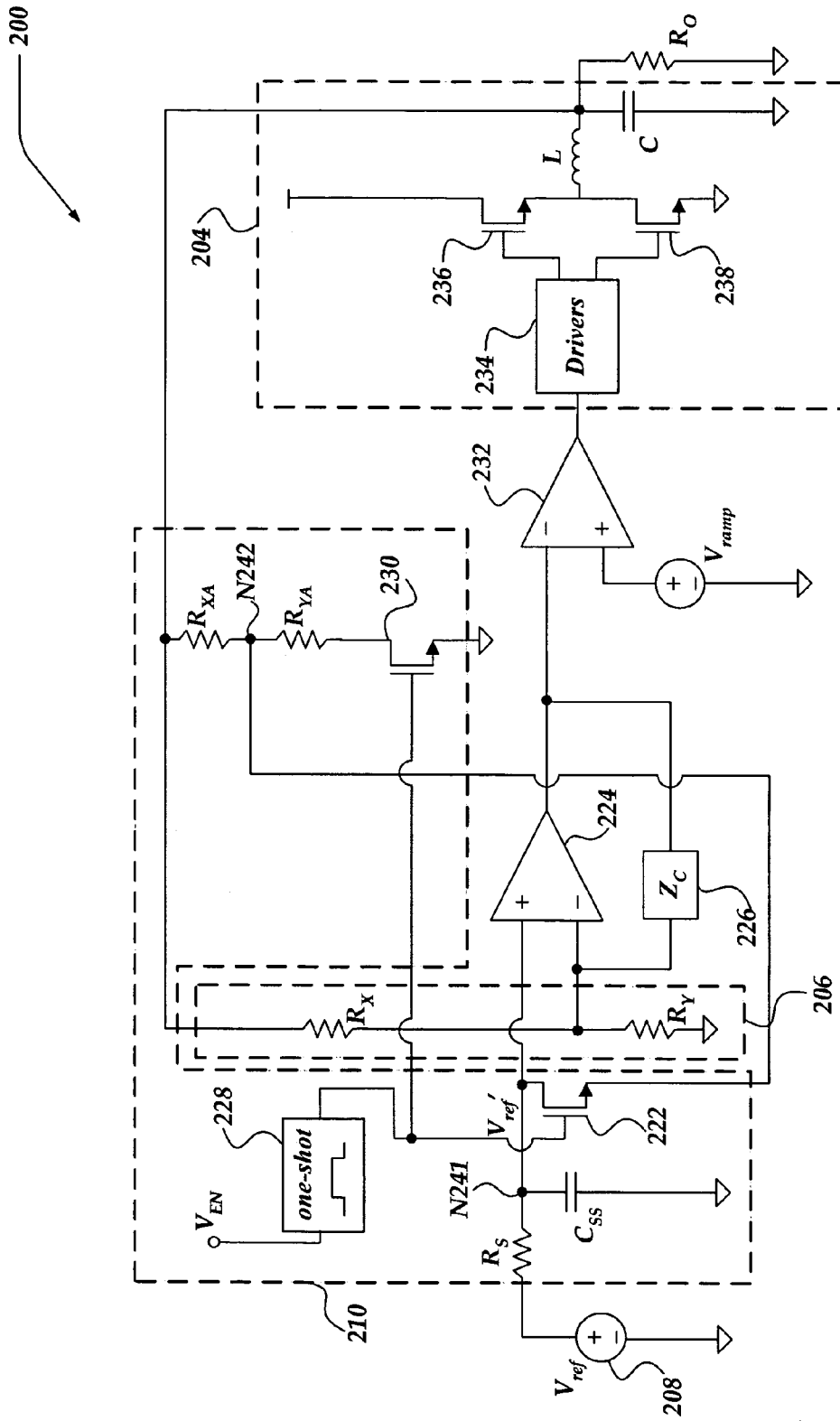
FIG. 2 schematically illustrates an embodiment of a switching voltage regulator according to the present invention.

FIG. 2 schematically illustrates an embodiment of switching voltage regulator circuit 200. Switching voltage regulator circuit 200 is arranged to provide a regulated output voltage $V_{out}$ based, in part, on input voltage $V_{in}$. Reference voltage $V_{ref}$ is employed to modify $V_{out}$ to have a soft starting slope.

Switching voltage regulator circuit 200 includes reference voltage source 208, soft start circuit 210, feedback circuit 206, error amplifier 224, feedback impedance $Z_C$, pulse-width-modulation (PWM) comparator 232, and output stage 204. A ramping voltage source providing $V_{ramp}$ and load resistance $R_O$ are also shown in FIG. 2.

In a typical operation, reference voltage source 208 provides reference voltage $V_{ref}$. Reference voltage source 208 may be off chip in one embodiment. Feedback circuit 206 includes primary voltage divider comprising resistors $R_X$ and $R_Y$. Primary voltage divider is arranged to provide output voltage $V_{out}$ to a inverting input of error amplifier 224, which is coupled to a node between resistors $R_X$ and $R_Y$.

Modified reference voltage $V_{ref}'$ is provided to a non-inverting input of error amplifier 224 at reference node N241 as described below. Feedback impedance $Z^C$ is arranged to couple a inverting input of error amplifier 224 to an output of the same amplifier. The output of error amplifier 224 is coupled to an input of PWM comparator 232. PWM comparator 232 is arranged to compare an output voltage of error amplifier 224 with ramping voltage $V_{ramp}$, creating a pulse width modulated signal that represents the difference between the output voltage and the reference voltages.

Output stage 204 is arranged to receive an output of PWM comparator 232 and to provide regulated output voltage $V_{out}$ to a load, represented by load resistance $R^O$ in FIG. 2. Output stage 204 includes drivers 234, regulation transistor 236, and output LC filter comprising series inductor L and parallel capacitor C. In one embodiment, output stage 204 may include synchronous regulation transistor M238 as well. While a synchronous regulation circuit is depicted in FIG. 2, the present invention is not so limited. In another embodiment, the circuit may employ asynchronous regulation. Output voltage $V_{out}$ is also provided to feedback circuit 206 and soft start circuit 210 for regulation and modification of reference voltage $V_{ref}$.

Soft start circuit 210 is arranged to modify reference voltage $V_{ref}$ such that $V_{ref}$ has a rapid decay following a disable condition and a slow rising slope when the circuit is re-enabled. Soft start circuit 210 includes soft start resistor $R_S$ and soft start capacitor $C_{SS}$, which are coupled at node N241, switches 222 and 230, one-shot device 228, primary voltage divider comprising resistors $R_X$ and $R_Y$, and auxiliary voltage divider comprising resistors $R_{XA}$ and $R_{YA}$. Auxiliary voltage divider comprising resistors $R^{XA}$ and $R_{YA}$ is arranged to provide a low resistance path between $V_{ref}'$ and the output when switches 222 and 230 are closed. Switch 222 is arranged to be controlled by an output of one-shot device 228. One-shot device 228, receives a fault enable signal $V_{EN}$ and then activates switch 222 to couple the reference node to a node between resistors $R_{XA}$ and RYA. In one embodiment, $V_{EN}$ may be associated with a disable condition, while in another embodiment $V_{EN}$ may be indicative of re-enabling of the circuit following a disable condition.

The auxiliary voltage divider is arranged to be coupled to ground when switch 230 is closed. Switch 230 is controlled by an output of one-shot device 228. One-shot device 228 is also arranged to receive the enable signal $V_{EN}$. One-shot device 228 essentially turns on switches 222 and 230 when the enable signal $V_{EN}$ is applied after a disable condition, and turns the switch off when the circuit is operating normally. In one embodiment, one-shot device 228 maybe a monostable multivibrator, a distable multivibrator, and the like.

Switches 222 and 230 are essentially low resistance switches and may include switch transistors. In one embodiment, switches 222 and 230 may include a BJT, an NMOS FET, and a PMOS FET transistor.

A discharge constant of capacitance at the reference node (node N241) may be determined by a value of $R_S$, a capacitance of $C_{SS}$, output capacitor C, and a value of $R_{XA}$ and $R_{YA}$ when both switches are closed. To achieve a rapid discharge of the reference node capacitance after a disable condition, $R_{XA}$ and $R_{YA}$ may be preselected with a low resistance: Rapid discharge of the reference node capacitance may result in slower increase of modified reference voltage $V_{ref}'$, and accordingly output voltage $V_{out}$, preventing undesirable output spikes or large discharge currents after a disable condition.

In a typical operation, a fault condition causes the enable signal $V_{EN}$ to transition from low to high. This change closes switches 222 and 230 resulting in modified reference voltage $V_{ref}'$ being discharged rapidly while the output of switching voltage regulator circuit 200 is open circuit. Output voltage $V_{out}$ may also be discharged through the low resistance path provided by the auxiliary voltage divider and switch 230.

Some time later, when the switching voltage regulator circuit is turned on again, modified reference voltage $V_{ref}'$ may begin increasing again. As $V_{ref}'$ increases output voltage $V_{out}$ may follow $V_{ref}'$ because of feedback impedance and the primary voltage divider around error amplifier 224. Typically, it is desirable for $V_{out}$ to follow $V_{ref}'$ because this prevents abrupt changes in $V_{out}$ allowing a controlled start-up. If $V_{out}$ changes abruptly start-up is not controlled and transients may be generated adversely affecting other circuits that are supplied by switching voltage regulator circuit 200.

As mentioned before, a rate at which $V_{ref}'$ changes is governed by the total capacitance at the non-inverting input of error amplifier 224 and a value of resistors $R_{XA}$ and $R_{YA}$ that make up the auxiliary voltage divider. By providing $V_{ref}'$ to node N242 between resistors $R_{XA}$ and $R_{YA}$ of the auxiliary voltage divider, which are arranged to have very low values, the rate at which $V_{ref}'$ decays may be much greater than without the auxiliary voltage divider. The faster decay may allow $V_{ref}'$ to match $V_{out}$ even when $V_{EN}$ is held low for very brief intervals. This may allow output voltage $V_{out}$ to always start up in a controlled manner.

While FIG. 2 shows the regulator circuit as a buck switching regulator, other regulation topologies such as fly-back, boost, switched capacitor, and the like, may also employ the soft starting method described above without departing from the scope and spirit of the present invention.

Figure 3:
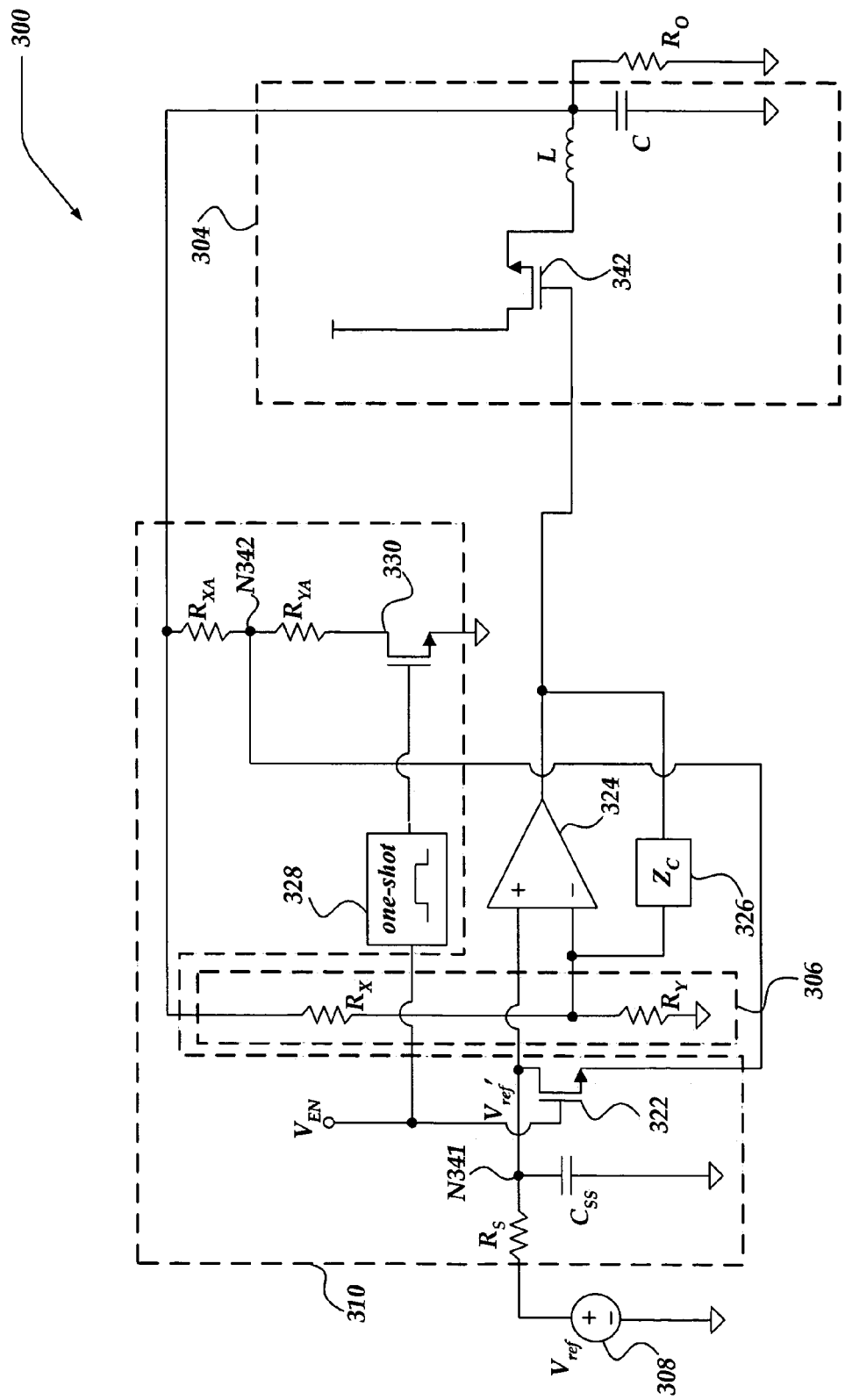
FIG. 3 schematically illustrates an embodiment of a linear voltage regulator circuit according to the present invention.

FIG. 3 schematically illustrates an embodiment of a linear voltage regulator circuit 300 according to the present invention. Linear voltage regulator circuit 300 includes reference voltage source 308, soft start circuit 310, feedback circuit 306, error amplifier 324, feedback impedance $Z_C$, and output stage 304.

Reference voltage source 308, soft start circuit 310, feedback circuit 306, error amplifier 324, and feedback impedance $Z_C$ essentially include same components and operate as the same way as described in FIG. 2.

Output stage 304 is, however, different. Instead of the drivers and switching transistors of the switching voltage regulator of FIG. 2, linear voltage regulator 300 includes power pass transistor 342 that is arranged to be operated in its linear region. A gate of power pass transistor 342 is controlled by an output of error amplifier 324. An output of power pass transistor 342 is coupled to an LC filter similar to the output stage of switching voltage regulator 200 of FIG. 2.

Figure 4:
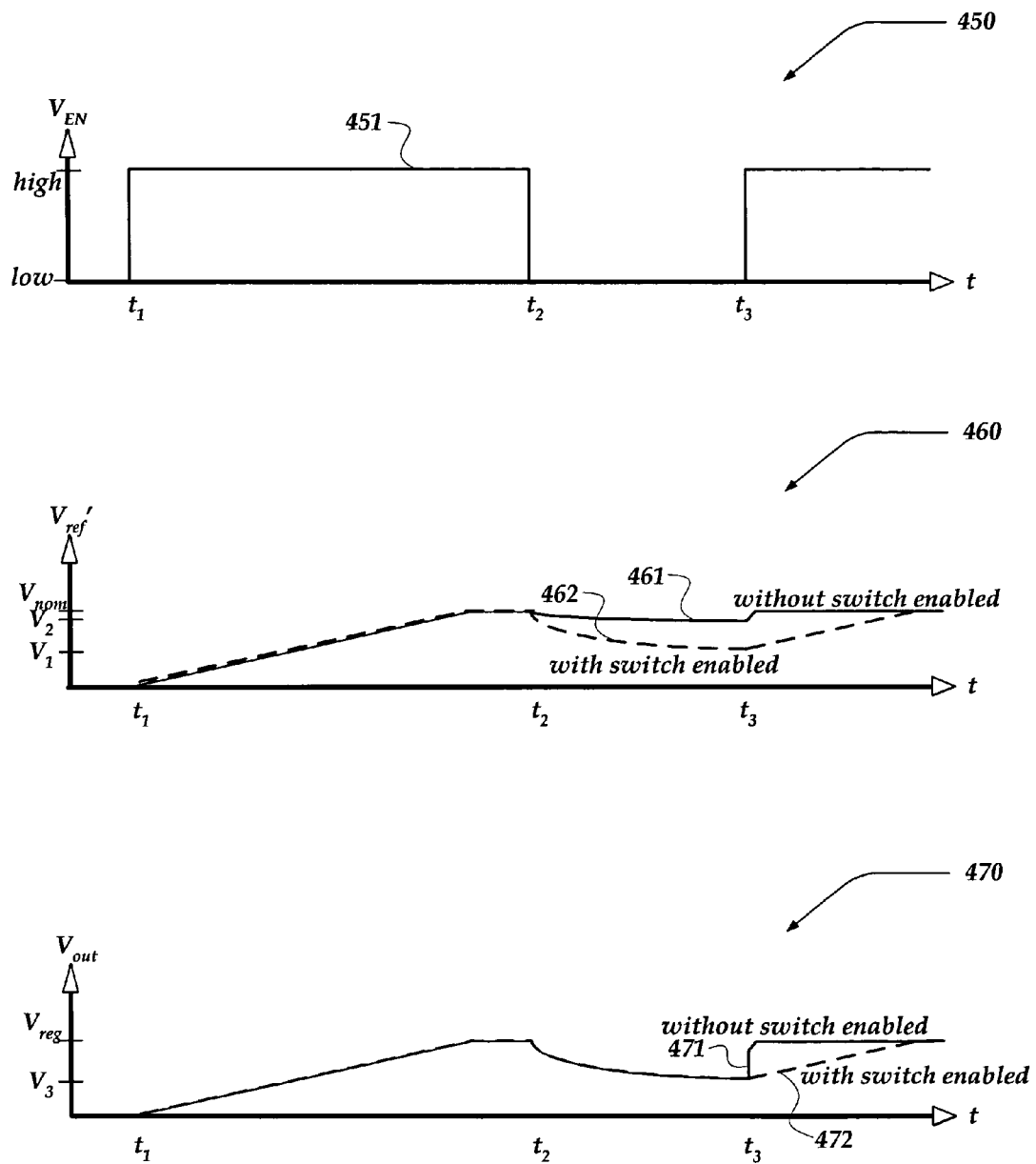
FIG. 4 illustrates voltage diagrams of reference and output voltages of an embodiment of the switching voltage regulator circuit of FIG. 2.

FIG. 4 illustrates voltage diagrams 450, 460, and 470 of enable, reference and output voltages $V_{EN}$, $V_{ref}'$, and $V_{out}$ of an embodiment of switching voltage regulator circuit 200 of FIG. 2. A vertical axis of each voltage diagram represents voltage, while a horizontal axis represents time.

Voltage diagram 450 includes waveform 451 of $V_{EN}$ during an exemplary operation of the switching voltage regulator circuit. The operation begins at time point $t_1$ when $V_{EN}$ changes to a high level. After a period of normal operation a disable condition such as a fault condition, a shutdown, and the like occurs at time point $t_2$, when $V_{EN}$ drops to a low level. Following a short duration, the circuit is enabled again at time point $t_3$ when $V_{EN}$ goes high again.

Voltage diagram 460 includes waveforms 461 and 462. Waveform 461 represents modified reference voltage $V_{ref}'$ under the conditions described above without the switch being enabled. Waveform 462 represents modified reference voltage $V_{ref}'$ under the same conditions when the effect of the enabled switch according to the present invention is included.

Both waveforms begin to rise slowly at $t_1$ following a linear slope and reach nominal voltage $V_{nom}$. The relatively high resistance of the primary voltage divider of switching voltage regulator circuit 200 may prevent a rapid discharge of capacitance at reference node N241 of FIG. 2. Therefore, following a disable condition at $t_2$, waveform 461 begins to decay slowly. Accordingly, $V_{ref}'$ drops to $V_2$ at $t_3$. When the circuit is enabled again, waveform 461 rises rapidly from $V_2$ to $V_{nom}$.

Waveform 462 is virtually identical to waveform 461 until $t_2$. However, waveform 462 decays at a relatively faster rate between $t_2$ and $t_3$ due to a low resistance discharge path provided by the auxiliary voltage divider of switching voltage regulator circuit 200 of FIG. 2. This low resistance path may decrease an RC time constant at reference node N241 resulting in a faster decay rate for $V_{ref}'$. Because the decay rate is faster, $V_{ref}'$ reaches $V_1$, which may be significantly lower than $V_2$ at $t_3$. When the circuit is enabled at $t_3$, waveform 462 begins to rise slowly and reaches nominal reference voltage $V_{nom}$ much later than waveform 461.

Voltage diagram 470 includes waveforms 471 and 472. Similar to voltage diagram 460, Waveform 471 represents output voltage $V_{out}$ under the conditions described above without an effect of the enabled switch. Waveform 472 represents $V_{out}$ under the same conditions when the effect of the enabled switch according to the present invention is included.

Both waveforms begin to rise slowly at $t_1$ following a linear slope and reach regulation voltage $V_{reg}$. When the disable condition occurs at $t_2$, both waveforms begin to decay according to an exponential capacitor decay curve of an output capacitor dropping to $V_3$ at $t_3$. When the circuit is enabled again, waveform 471 rises rapidly to $V_{reg}$ potentially generating voltage and current transients.

Waveform 472, however, rises at a slower rate after $t_3$ due to slowly rising modified reference voltage $V_{ref}'$. $V_{out}$ of waveform 472 reaches $V_{reg}$ later, but voltage and current transients are prevented.

The above specification, examples and data provide a description of the manufacture and use of the composition of the invention. Since many embodiments of the invention can be made without departing from the spirit and scope of the invention, the invention also resides in the claims hereinafter appended.

We claim:

1. A voltage regulator circuit, comprising:
    an output stage that is arranged to receive a power source voltage and to provide a regulated output voltage to a load in response to the power source voltage and an error voltage;
    a feedback circuit that is arranged to receive the output voltage and provide a feedback voltage when the circuit is enabled;
    a soft start circuit that is arranged to receive a reference voltage and provide a modified reference voltage at a reference node, wherein the soft start circuit includes a low resistance discharge path to the modified reference voltage at the reference node when the circuit is disabled such that the modified reference voltage has a soft starting slope when the circuit is re-enabled; and
    an error amplifier that is arranged to receive the feedback voltage and the modified reference voltage and to provide the error voltage based on the feedback voltage and the modified reference voltage to the output stage.

2. The circuit of claim 1, further comprising a pulse width modulation (PWM) comparator that is arranged to receive the error voltage and a ramping voltage, and to provide a pulse width modulated driver voltage based on the error voltage and the ramping voltage to the output stage.

3. The circuit of claim 2, wherein the ramping voltage is provided by at least one of an external voltage source and an in-circuit voltage source.

4. The circuit of claim 1, wherein the reference voltage is provided by an external voltage source.

5. The circuit of claim 1, wherein the circuit is a switching voltage regulator and the output stage comprises at least one driver and at least one switching transistor.

6. The circuit of claim 1, wherein the circuit is a linear voltage regulator and the output stage comprises at least one power pass transistor operating in a linear region.

7. The circuit of claim 1, wherein the output stage is coupled to an LC filter.

8. The circuit of claim 1, wherein the feedback circuit comprises a primary voltage divider that is arranged to provide a portion of the output voltage to an input of the error amplifier when the circuit is enabled.

9. The circuit of claim 1, wherein the soft start circuit comprises:
a soft start capacitor and a soft start resistor such that the soft start capacitor and the soft start resistor are coupled at the reference node; and
an auxiliary voltage divider that is arranged to provide a low resistance discharge path to the modified reference voltage when the circuit is disabled.

10. The circuit of claim 9, wherein the auxiliary voltage divider comprises:
a first resistor and a second resistor coupled in series, wherein the first resistor is also coupled to an output of the circuit;
a first switch that is arranged to couple the first and the second resistor to a ground, if the first switch is closed; and
a second switch circuit that is arranged to couple the reference node to a node between the first and the second resistors when the second switch is closed such that a low resistance path is provided to the modified reference voltage at the reference node.

11. The circuit of claim 10, wherein the first resistor and the second resistor are preselected to have a low resistance.

12. The circuit of claim 10, wherein the first and the second switches comprise at least one of a BJT transistor, an NMOS FET transistor, and a PMOS FET transistor.

13. The circuit of claim 10, wherein the soft start circuit further comprises a one-shot device that is arranged to close the second switch on based on an enable signal.

14. The circuit of claim 13, wherein the one-shot device includes one of a mono-stable multivibrator and a di-stable multivibrator.

15. The circuit of claim 13, wherein the enable signal is arranged to close the first switch and the second switch when the circuit is disabled.

16. The circuit of claim 13, wherein the enable signal is arranged to open the first switch and the second switch when the circuit re-enabled.

17. The circuit of claim 5, wherein the circuit is an asynchronous regulator and the output stage includes one switching transistor.

18. The circuit of claim 5, wherein the circuit is a synchronous regulator and the output stage includes two switching transistors.

19. A method for controlling voltage regulation, comprising:
modifying a reference voltage to provide a modified reference voltage that has a soft starting slope;
providing a low-resistance discharge path to the modified reference voltage when a disable condition occurs, such that the modified reference voltage decays relatively rapidly;
providing an error voltage based, in part, on the modified reference voltage;
providing an output voltage based, in part, on the error voltage and an input voltage; and
providing a low-resistance discharge path to the output voltage such that the output voltage decays relatively rapidly when the disable condition occurs.

20. The method of claim 19 further comprising:
providing the low resistance discharge path to the modified reference voltage and the output voltage based, in part, on a fault enable signal.

21. The method of claim 19, wherein the low resistance discharge path is provided by a voltage divider comprising very low value resistors and a switch that is controlled by the fault enable signal.

22. A switching voltage regulator circuit, comprising:
a means for modifying a reference voltage such that the modified reference voltage has a soft starting slope;
a means for providing a low resistance discharge path to the modified reference voltage such that the modified reference voltage discharges rapidly following a fault condition;
a means for providing a low resistance discharge path to an output voltage such that the output voltage discharges rapidly following the fault condition;
a means for providing an error voltage based on the modified reference voltage; and
a means for regulating an input voltage based, in part on, the error voltage.

* * * * *

UNITED STATES PATENT AND TRADEMARK OFFICE
CERTIFICATE OF CORRECTION

PATENT NO. : 6,965,223 B1  Page 1 of 1
DATED : November 15, 2005
INVENTOR(S) : William Maclean et al.

It is certified that error appears in the above-identified patent and that said Letters Patent is hereby corrected as shown below:

Column 3,
Line 16, delete "Vin" and insert -- $V_{in}$ --.
Line 63, delete "$Z^C$" and insert -- $Z_C$ --.

Column 4,
Line 6, delete "$R^O$" and insert -- $R_O$ --.
Line 25, delete "$R^{XA}$" and insert -- $R_{XA}$ --.
Line 31, delete "RYA." and insert -- $R_{YA.}$ --.
Line 56, delete "resistance:" and insert -- resistance. --.

Signed and Sealed this

Fourth Day of April, 2006

JON W. DUDAS
*Director of the United States Patent and Trademark Office*